(12) United States Patent
Holmer et al.

(10) Patent No.: US 6,425,265 B1
(45) Date of Patent: Jul. 30, 2002

(54) PROCESS AND APPARATUS FOR PURIFYING HYDROGEN BROMIDE

(75) Inventors: Arthur Edward Holmer, Rensselaerville; James Philip Natwora, Jr., Eden, both of NY (US); Sateria Salim, San Jose, CA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/963,035

(22) Filed: Sep. 26, 2001

(51) Int. Cl.[7] .................................................. F25J 3/00
(52) U.S. Cl. ........................................................ 62/617
(58) Field of Search ............................ 62/617, 908, 93

(56) References Cited

U.S. PATENT DOCUMENTS

| | | | |
|---|---|---|---|
| 4,119,413 A | * 10/1978 | Larsen et al. ................... | 55/71 |
| 4,150,548 A | * 4/1979 | Kemp et al. ...................... | 62/18 |
| 4,853,148 A | 8/1989 | Tom et al. ................... | 252/194 |
| 4,925,646 A | 5/1990 | Tom et al. ................... | 423/488 |
| 5,316,616 A | 5/1994 | Nakamura et al. .......... | 156/643 |
| 5,589,148 A | * 12/1996 | Otsuka et al. ............... | 423/240 |
| 5,685,169 A | 11/1997 | Nagamura et al. ............ | 62/617 |
| 6,333,437 B1 | * 12/2001 | Taketani et al. ............ | 568/634 |

OTHER PUBLICATIONS

Stenger, V., Atchison, G., "Bromide Compounds", Kirk Othmer Encyclopedia of Chemical Technology, 3rd Edition, vol. 4, John Wiley & Sons, pp 245 and 259.

* cited by examiner

Primary Examiner—William C. Doerrler
Assistant Examiner—Malik N. Drake
(74) Attorney, Agent, or Firm—Bernard Lau

(57) ABSTRACT

A process for removing impurities such as oxygen, nitrogen, carbon monoxide, hydrogen, water (moisture), carbon dioxide, hydrogen chloride, methane and trace metals from crude hydrogen bromide and the apparatus for purifying such crude hydrogen bromide.

18 Claims, 1 Drawing Sheet

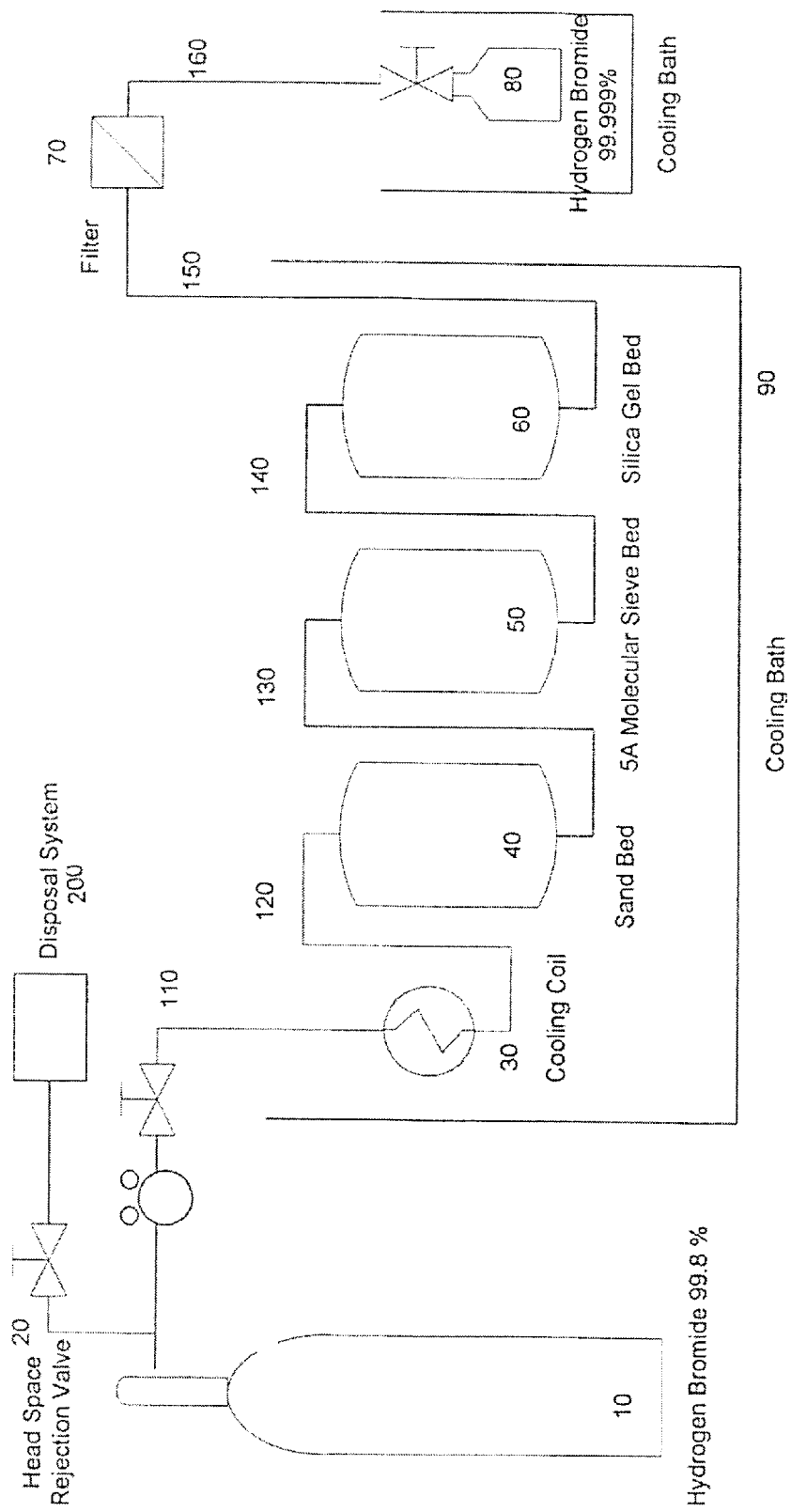

PROCESS AND APPARATUS FOR PURIFYING HYDROGEN BROMIDE

FIELD OF THE INVENTION

This invention is directed to a process and apparatus for purifying hydrogen bromide by removing the impurities and trace metals.

BACKGROUND OF THE INVENTION

Hydrogen bromide has a wide range of applications due to its ability to act as a catalyst and/or reagent. An important recent application in semiconductor fabrication is its use as an etchant. Generally, the main impurities in hydrogen bromide are oxygen, nitrogen, carbon monoxide, methane, hydrogen, moisture, carbon dioxide, hydrogen chloride and trace metals, such as iron. For good etching performance in semiconductor fabrication, it is generally necessary to have highly pure hydrogen bromide. Thus, purity levels of 99.999% are preferably to achieve control of the etching in fabricating semiconductor components.

In the table below, the 99.999% column shows the preferred required impurity levels of hydrogen bromide for use in semiconductor processes.

| Impurity | 99.999% |
| --- | --- |
| Oxygen | <1 ppm |
| Nitrogen | <3 ppm |
| Hydrogen | <500 ppm |
| Carbon Monoxide | <1 ppm |
| Methane | <1 ppm |
| Carbon Dioxide | <3 ppm |
| Moisture | <1 ppm |
| Hydrogen Chloride | <10 ppm |
| Iron | <0.2 ppm |

A number of prior art relating to hydrogen bromide is known, but none of which teaches or suggests the present invention.

U.S. Pat. No. 5,316,616 discloses a process of dry etching a material such as polycrystalline silicon and suicides with hydrogen bromide or bromine. Plasma etching with hydrogen bromide or bromine as an etching gas allows a precise control of attaining vertical etching or taper etching with a desired taper angle by controlling a temperature of a mass to be etched, which mass is a phosphorus-doped n-type polycrystalline silicon, phosphorus-doped single crystalline or phosphorus-doped silicides semiconductor wafer.

U.S. Pat. No. 5,685,169 discloses a method and apparatus for preparing high purity hydrogen bromide. The starting material, hydrogen bromide, contains impurities having low boiling points is supplied to an intermediate space. While the gas phase of the starting hydrogen bromide is allowed to ascend through an upper rectifying section, it is brought into contact with a first reflux solution flowing in the reverse direction. The uncondensed gas stored in an upper space is cooled and partly condensed. The condensed liquid is allowed to flow down through an upper rectifying section as the first reflux solution. The liquid-phase of the starting hydrogen bromide is mixed with the first reflux solution in the intermediate space and serves as a second reflux solution. The liquid stored in a lower space is heated and partly evaporated. The liquid stored in the lower space is supplied outside as high purity hydrogen bromide. The uncondensed gas stored in the upper space is discharged outside.

U.S. Pat. No. 4,925,646 discloses a process for drying a gaseous hydrogen halide to remove water impurity therefrom, in which a scavenger precursor composition is provided, including a support having associated therewith partially or fully alkylated metal alkyl compounds or pendant groups. The precursor composition is reacted with gaseous hydrogen halide to convert the metal alkyl compounds and/or pendant functional groups to the corresponding metal halide compounds and/or pendant functional groups, which in turn react with the water impurity to produce an essentially completely water-free (below 0.1 ppm) gaseous hydrogen halide effluent.

U.S. Pat. No. 4,853,148 discloses a process for drying a gaseous hydrogen halide to remove water impurity therefrom. The active scavenging moiety is selected from one or more members of the group consisting of (i) metal halide compounds dispersed in the support, of the formula $MX_y$; and (ii) metal halide pendant functional groups of the formula $—MX_{y-1}$ covalently bonded to the support, wherein M is a y-valent metal, and y is an integer whose value is from 1 to 3. The corresponding partially or fully alkylated compounds and/or pendant functional groups, of the metal halide compounds and/or functional groups of (a); wherein the alkylated compounds and/or pendant functional groups, when present, are reactive with the gaseous hydrogen halide to form the corresponding halide compounds and/or pendant functional groups of (a); and M being selected such that the heat of formation, $\Delta H_f$ of its hydrated halide, $MX_y(H_2O)_n$, is governed by the relationship $\Delta H_f \geq n \times 10.1$ kilocalories/mole of such hydrated halide compound wherein n is the number of water molecules bound to the metal halide in the metal halide hydrate.

U.S. Pat. No. 4,119,413 discloses a method for recovering hydrogen bromide gas from a gaseous stream with a nonaqueous hydrogen bromide absorbent containing acetic acid to absorb at least a portion of the hydrogen bromide. The hydrogen bromide containing absorbent is then heated to desorb at least a portion of the hydrogen bromide.

An object of the present invention is to provide a process for purifying hydrogen bromide comprising several steps in which the sequence of the steps produces a high purified hydrogen bromide.

Another object of the present invention is to provide a process for purifying hydrogen bromide comprising several steps in which one step involves the removal of the two acids, carbon dioxide and hydrogen chloride, from hydrogen bromide, which is another acid.

Another object of the present invention is to provide an economical and low cost process for purifying hydrogen bromide, which does not use the conventional distillation columns approach.

Another object of the present invention is to provide an apparatus for purifying hydrogen bromide.

SUMMARY OF THE INVENTION

The invention relates to a process for purifying hydrogen bromide comprising the steps of (a) feeding hydrogen bromide into a cooling bath to produce a flowable hydrogen bromide that is above its freezing temperature and below its ice water temperature; (b) feeding the hydrogen bromide from step (a) into a first adsorbent trap, such as a sand trap, to effectively remove moisture and any free bromine; (c) feeding the hydrogen bromide from step (b) into a molecular sieve to effectively remove any carbon dioxide and hydrogen chloride without removing the hydrogen bromide; and (d) feeding the hydrogen bromide from step (c) into a second adsorbent trap, such as a silica gel trap, to effectively remove any remaining moisture and trace metals to produce hydrogen bromide having a purity of above about 99.9% and preferably above about 99.999%. The purified hydrogen bromide of step (d) could be further filtered using a 0.01 micrometer filter to remove any particulates that may have been transported from the adsorbent traps and any trace metals that may be in the form of solids. The purified hydrogen bromide can then be accumulated in a vessel that is placed in a bath that is at a temperature between about −75° C. and −196° C., preferably between about −75° C. and −85° C., and most preferably about −78° C. The temperature of the cooling bath in step (a) can be between about 0° C. and −86.9° C., preferably between about −10° C. and −50° C., and most preferably about −25° C.

Generally, cylinders of hydrogen bromide are typically charged to a maximum fill density of 135%. This fill density is calculated by dividing the mass of the product in the cylinder by the mass of water the cylinder would contain when filled full. Consequently, a typical fill of hydrogen bromide would leave approximately 25% of the cylinder volume as vapor space. Thus, the hydrogen bromide cylinder generally is the storage vessel for crude hydrogen bromide to be purified. This hydrogen bromide is typically 99.0% pure and contains approximately 200 ppm oxygen, 3000 ppm nitrogen, 5000 ppm hydrogen, 200–300 ppm carbon monoxide, 200–300 ppm methane, 10–100 ppm carbon dioxide, 10 ppm moisture, 200 ppm hydrogen chloride and 5–10 ppm of various trace metals, mainly iron.

The head space of the crude hydrogen bromide can be vented by valve means or the like to remove oxygen, nitrogen, hydrogen, carbon monoxide and methane.

Consequently, an additional step could be added to the process before step (a) and such step would include venting the vapor in a cylinder containing hydrogen bromide to remove impurities of oxygen, nitrogen, hydrogen, carbon monoxide and methane. Preferably, the venting step could be repeated at intervals between 2 and 5 times for a time period of between 5 and 15 minutes to substantially remove the gas impurities recited above.

The subject invention also relates to an apparatus for purifying hydrogen bromide comprising a cooling container containing: (a) a cooling means, such as a cooling coil, adapted for cooling hydrogen bromide and having input and output openings; (b) a first adsorbent means with an input opening coupled to the output of the cooling means and an output opening, and the first adsorbent means being adapted for removal of moisture and free bromine from hydrogen bromide; (c) a molecular sieve means with an input opening coupled to the output of the first adsorbent means and an output opening, and the molecular sieve means being adapted for removing carbon dioxide and hydrogen chloride from hydrogen bromide; and (d) a second adsorbent means with an input opening coupled to the output of the molecular sieve means and an output opening, and second adsorbent means being adapted for removing moisture and trace metals from hydrogen bromide. A filter means could be added such that its input that could be coupled to the output of the second adsorbent means and an output opening and the filter means being adapted for removing any particulates from the hydrogen bromide that may have been transported from the adsorbent means of the apparatus.

Briefly, the present invention preferably involves a series in a particular sequence of a sand bed, a molecular sieve bed, and a silica gel bed. The primary contaminants of the hydrogen bromide process are hydrogen chloride and carbon dioxide. An unexpected finding was that a 5A molecular sieve trap would work for separating hydrogen chloride and carbon dioxide from hydrogen bromide. Removing hydrogen chloride and carbon dioxide (two acids) from a third acid, hydrogen bromide, is a very difficult separation. Discovering that 5A sieve would take three acids (hydrogen bromide, hydrogen chloride and carbon dioxide) with the same acidic properties and remove two of these acids (hydrogen chloride and carbon dioxide) without removing the hydrogen bromide was unexpected.

The preferred embodiment of the subject invention is a process based on head space rejection from a hydrogen bromide cylinder, a cooling coil, a sequence of sand, molecular sieve and silica gel traps, and filter and condensing means that will produce hydrogen bromide of 99.9% purity or higher.

BRIEF DESCRIPTION OF THE DRAWING

The sole drawing, FIG. 1, is a schematic of a hydrogen bromide purification system.

DETAILED DESCRIPTION OF THE PREFERRED EMBODIMENT

As shown in the drawing, the process sequence consists of the following: 1) A hydrogen bromide cylinder 10. 2) A head space rejection valve 20 and disposal system 200. 3) A cooling coil 30. 4) A sand (silicon dioxide, quartz) bed 40. 5) A 5A molecular sieve bed 50. 6) A silica gel bed 60. 7) A 0.01 micrometer filter 70. 8) A receiving vessel for the purified hydrogen bromide 80.

These components are connected as shown in FIG. 1. The preferred entire system is placed in a cooling both 90. Hydrogen bromide 10 enters cooling coil 30 via line 110 and is allowed to reach the temperature of cooling bath 90. Hydrogen bromide then enters the top of bed 40 via line 120. The gas comes out of the sand bed at the bottom and proceeds to the 5A molecular sieve trap 50 via line 130. The gas enters the top of the 5A molecular sieve bed 50 and exits from the bottom of 50 and proceeds to the silica gel bed 60 via line 140. The gas enters the top of the silica gel bed 60 and exits through the bottom. The gas then proceeds to filter 70 via line 150. After the filter, the gas proceeds to the receiving vessel 80 via line 160 and the vessel is placed in a cooling bath.

The preferred beds are prepared as follows:

Sand (Silicon Dioxide)

A 500 mL size stainless steel Hoke cylinder with glass wool end packing was filled to an approximate density of 2.6 grams per milliliter with Fisher Chemical "Fine Granular Grade" sand. The trap was conditioned for 48 hours at 400° C. under a flow of 400 mL/minute of dry nitrogen or other inert gas. The bed is conditioned to remove any adsorbed contaminants. If the bed is not conditioned, the impurity removal may be decreased and bed impurities will be introduced as a new contaminant in the hydrogen bromide.

5A Molecular Sieve

A 500 mL size stainless steel Hoke cylinder with glass wool end packing was filled to an approximate density of 0.65 grams per milliliter with UOP Chemical, 1/16 inch pellets 5A molecular sieve. The trap was conditioned at 400° C. for 16 hours under a flow of 300 mL/minute of dry nitrogen or other inert gas. The trap was further conditioned for 4 hours at 400° C. under a vacuum. The bed is conditioned to remove any adsorbed contaminants. If the bed is not conditioned, the impurity removal may be decreased and bed impurities will be introduced as a new contaminant in the hydrogen bromide.

Silica Gel 500 mL size stainless steel Hoke cylinder with glass wool end packing was filled to an approximate density of 1.4 grams per milliliter with Fisher Chemical "Chromatographic Grade", 60–100 mesh silica gel. The trap was conditioned for 72 hours at 300° C. under a flow of 375 mL/minute of dry nitrogen or other inert gas. The bed is conditioned to remove any adsorbed contaminants. If the bed is not conditioned, the impurity removal will be decreased and bed impurities may be introduced as a new contaminant in the hydrogen bromide.

The function of each component is as follows: the hydrogen bromide cylinder 10 is the storage vessel for the crude hydrogen bromide to be purified. This material is typically 99.0% (2.0) pure. It typically contains approximately 200 ppm oxygen, 3000 ppm nitrogen, 5000 ppm hydrogen, 200–300 ppm carbon monoxide, 200–300 ppm methane, 10–100 ppm carbon dioxide, 10 ppm moisture, 200 ppm hydrogen chloride and 5–10 ppm of various trace metals, mainly iron. The head space rejection valve 20 is used to vent the head space of the crude hydrogen bromide storage vessel 10 and the vented material is dispersed in a conventional disposal system 200. This removes oxygen, nitrogen, hydrogen, carbon monoxide and methane. The cooling coil 30 brings the temperature of the crude hydrogen bromide in the storage vessel 10 down to the cooling bath 90 temperature. This allows the maximum efficiency to be attained in the adsorbent traps. The sand (silicon dioxide, quartz) trap (adsorbent) 40 removes moisture and free bromine (if any). The 5A molecular sieve trap 50 removes carbon dioxide and hydrogen chloride. The silica gel trap 60 (adsorbent) removes moisture and trace metals. The 0.01 micrometer filter 70 removes any particulates that may have been transported from the beds plus trace metals that may be in the form of solids. The receiving vessel for the purified hydrogen bromide 80 is used to accumulate the purified hydrogen bromide.

The preferred embodiment of the process of the subject invention is best operated as follows: 1) Reject one percent of the crude hydrogen bromide to a disposal system 200 at a rate of 28 sLpm. This rate could be between about 23 and 43 sLm, preferably between about 18 and 38 sLm. Allow the crude vessel to stand for at least one hour. Repeat four times for a total of five percent of the starting crude hydrogen bromide mass. 2) Set cooling bath (90) to −25° C. and receiving bath (80) to −78° C. The cooling bath 90 could be between about 0° C. and −86.9° C., and the receiving bath 80 could be between about −75° C. and −196° C. 3) Set crude delivery pressure at 20 psig, but could be between about 0 and 150 psig. 4) Flow gaseous hydrogen bromide at a rate of one sLpm through the system. 5) Continue flow until about 70 to 90 percent, preferably about 80 percent of the starting mass of the crude hydrogen bromide has been removed from the storage container.

The process may also be operated with liquid phase hydrogen bromide as follows: 1) Reject had space as given in #1 above for vapor phase purification. 2) Set cooling bath at −70° C. and receiving bath at −78° C. 3) Invert crude hydrogen bromide storage container. 4) Flow liquid hydrogen bromide at a rate of between 50 and 500, and preferably 250 grams per minute through the system. 5) Continue flow until between 90 and 100, and preferably 95% of the starting mass of the crude hydrogen bromide has been removed from the container. 6) Liquid phase processing yields advantages in faster throughput, but this is generally offset by product contamination difficulties with non volatile residue, particles and trace metals that are present in the liquid phase. With gaseous processing, these impurities are left behind and are not present in the purified product.

The materials of the prior art disclosures could be used in place of the preferred adsorbents described above. The temperatures and pressures used in the process could be varied. It was experimentally determined that bed adsorption improved as the temperature was decreased. The lower temperature limit for adsorption is then the freezing point of hydrogen bromide, −86.9° C. However, the process could be operated above the freezing point at very low pressure and flow rate. It would not be cost effective to operate at this point as the low vapor pressure of hydrogen bromide would not supply enough driving force to allow gas to flow through the beds.

For liquid processing, the lower limit is also the freezing point of hydrogen bromide. The optimal temperature of −70° C. enables enough fluid to have some vapor pressure to act as a driving force to move material through the process. However, the process could be operated above the freezing point at very low pressure (between about 0 and 1 psig) and flow rate (between about 1 and 500 grams per minute).

In principle, liquid phase processing could be operated at temperatures up to the critical temperature (89.8° C.) of hydrogen bromide.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A process for purifying hydrogen bromide comprising the steps of:
    (a) feeding hydrogen bromide into a cooling bath to produce a flowable hydrogen bromide that is above the freezing temperature and below the ice water temperature;
    (b) feeding said hydrogen bromide from step (a) into a first adsorbent trap to effectively remove moisture and any free bromine;
    (c) feeding said hydrogen bromide from step (b) into a molecular sieve to effectively remove any carbon dioxide and hydrogen chloride without removing the hydrogen bromide; and
    (d) feeding said hydrogen bromide from step (c) into a second adsorbent trap to effectively remove any remaining moisture and trace metals to produce a purified hydrogen bromide.

2. The process of claim 1 further comprising the steps of:
    (e) filtering the hydrogen bromide from step (d) to remove particulates that may have been transported from the adsorbent traps and any trace metals that may be in the form of solids to produce hydrogen bromide have a purity of above and about 99.9%; and
    (f) accumulating said purified hydrogen bromide into a cylinder in a recovery bath having a temperature between about −75° C. and about −196° C.

3. The process of claim 2 further comprising the step of storing hydrogen bromide in a cylinder and venting any resulting vapor from the cylinder to remove at least one impurity selected from the group comprising oxygen, nitrogen, hydrogen, carbon monoxide and methane prior to step (a).

4. The process of claim 3 wherein the first adsorbent trap comprises sand.

5. The process of claim 3 wherein the second adsorbent trap comprises silica gel.

6. The process of claim 3 wherein the molecular sieve comprises 5A molcular sieve.

7. The process of claim 3 wherein the cooling bath in step (a) is at a temperature between about 0° C. and −86.9° C.

8. The process of claim 7 wherein the cooling bath of claim 1 is at a temperature of about −25° C. and the receiving bed is at a temperature of about −78° C.

9. The process of claim 1 further comprising the step of storing hydrogen bromide in a cylinder and venting any resulting vapor from the cylinder to remove at least one impurity selected from the group comprising oxygen, nitrogen, hydrogen, carbon monoxide and methane prior to step (a).

10. The process of claim 1 wherein the first adsorbent trap comprises sand.

11. The process of claim 1 wherein the second adsorbent trap comprises silica gel.

12. The process of claim 1 wherein the molecular sieve comprises 5A molecular sieve.

13. The process of claim 1 wherein the cooling bath in step (a) is at a temperature between about 0° C. and −86.9° C.

14. An apparatus for purifying hydrogen bromide comprising a cooling container containing: (a) a cooling means adapted for cooling hydrogen bromide and having input and output openings; (b) a first adsorbent means with an input opening coupled to the output of the cooling means and an output opening, and said first adsorbent means being adapted for removal of moisture and free bromine from hydrogen bromide; (c) a molecular sieve means with an input opening coupled to the output of the first adsorbent means and an output opening, and said molecular sieve means being adapted for removing carbon dioxide and hydrogen chloride from hydrogen bromide; and (d) a second adsorbent means with an input opening coupled to the output of the molecular sieve and an output opening, and second adsorbent means being adapted for removing moisture and trace metals from hydrogen bromide.

15. The apparatus of claim 14 wherein filter means having an input opening coupled to the output opening of said second adsorbent means and an output opening, and said filter means adapted for removing particulates and solid metal particles.

16. The apparatus of claim 14 wherein said first adsorbent means comprises a sand trap.

17. The apparatus of claim 14 wherein said second adsorbent means comprises a silica gel trap.

18. The apparatus of claim 14 wherein said molecular sieve means comprises a 5A molecular sieve trap.

* * * * *